US011974659B2

(12) United States Patent
Strickland et al.

(10) Patent No.: US 11,974,659 B2
(45) Date of Patent: May 7, 2024

(54) TOOTHBRUSH SUCTION APPARATUS AND METHOD

(71) Applicants: RUTGERS, THE STATE UNIVERSITY OF NEW JERSEY, New Brunswick, NJ (US); NEW JERSEY INSTITUTE OF TECHNOLOGY, Newark, NJ (US)

(72) Inventors: Maxine Strickland, Paramus, NJ (US); Vivek Ashok Kumar, Newark, NJ (US)

(73) Assignees: RUTGERS, THE STATE UNIVERSITY OF NEW JERSEY, New Brunswick, NJ (US); NEW JERSEY INSTITUTE OF TECHNOLOGY, Newark, NJ (US)

( * ) Notice: Subject to any disclaimer, the term of this patent is extended or adjusted under 35 U.S.C. 154(b) by 678 days.

(21) Appl. No.: 16/972,954

(22) PCT Filed: Jun. 7, 2019

(86) PCT No.: PCT/US2019/035997
§ 371 (c)(1),
(2) Date: Dec. 7, 2020

(87) PCT Pub. No.: WO2019/236968
PCT Pub. Date: Dec. 12, 2019

(65) Prior Publication Data
US 2021/0244173 A1    Aug. 12, 2021

Related U.S. Application Data

(60) Provisional application No. 62/682,464, filed on Jun. 8, 2018.

(51) Int. Cl.
*A46B 15/00* (2006.01)
*A46B 5/00* (2006.01)
(Continued)

(52) U.S. Cl.
CPC ........ *A46B 15/0053* (2013.01); *A46B 5/0095* (2013.01); *A46B 9/04* (2013.01);
(Continued)

(58) Field of Classification Search
None
See application file for complete search history.

(56) References Cited

U.S. PATENT DOCUMENTS

D274,575 S     7/1984  Kronner
4,685,819 A    8/1987  Endo
(Continued)

FOREIGN PATENT DOCUMENTS

| CN | 201642397 U | 11/2010 |
| JP | 3034507 B1 | 4/2000 |
| JP | 2002058537 A | 2/2002 |
| KR | 101541176 B1 | 8/2015 |

OTHER PUBLICATIONS

JP 3034507 translation (Year: 2023).*
(Continued)

*Primary Examiner* — Eric W Golightly
(74) *Attorney, Agent, or Firm* — MARSHALL, GERSTEIN & BORUN LLP

(57) ABSTRACT

A suction assembly, toothbrush, and method are provided that suction fluids and debris resulting from brushing. The suction assembly includes a housing configured to couple to the toothbrush so that a portion extends around sides and a back of the toothbrush head and is spaced from the toothbrush head by a gap. The suction assembly further includes a vacuum pump, a collection reservoir, and one or more conduits that couple the vacuum pump, suction head portion, and collection reservoir to apply a suction around the toothbrush head through the gap and deposit suctioned material in the collection reservoir.

15 Claims, 4 Drawing Sheets

(51) Int. Cl.
  *A46B 9/04* (2006.01)
  *A46B 13/02* (2006.01)
  *A61C 17/08* (2006.01)
  *A61C 17/12* (2006.01)
  *A61C 17/22* (2006.01)

(52) U.S. Cl.
  CPC .......... *A46B 13/02* (2013.01); *A46B 15/0048* (2013.01); *A61C 17/08* (2019.05); *A61C 17/125* (2019.05); *A61C 17/227* (2013.01)

(56) References Cited

U.S. PATENT DOCUMENTS

| | | | |
|---|---|---|---|
| 5,062,413 | A | 11/1991 | Bullard |
| 5,463,792 | A | 11/1995 | Hogan et al. |
| 6,315,556 | B1 | 11/2001 | Stewart |
| D655,509 | S | 3/2012 | Dombrowski |
| 9,351,816 | B2 | 5/2016 | Prendergast et al. |
| 2011/0151404 | A1 | 6/2011 | Dombrowski |

OTHER PUBLICATIONS

CN 201642397 translation (Year: 2023).*
JP 2002058537 translation (Year: 2023).*
European Patent Application No. 19814148.3, Extended European Search Report, dated Feb. 4, 2022, 8 pages.
International Search Report and Written Opinion received for PCT/US19/35997 dated Aug. 28, 2019, 8 pages.
Plak-Vac Oral Care Solutions User Manual from Trademark Medical, available at least as early as Dec. 9, 2017: http://www.trademarkmedical.com/docs/TM-Plak-Vac-System-M1019.pdf, 4 pages.
Res-Q-Vac Hand Held Medical Suction from RMS Medical Products, product manual, available at least as early as Dec. 9, 2017, 2 pages.
Toothette Single Use Suction Toothbrush System from Sage Products, product manual, available at least as early as Dec. 9, 2017, 22 pages.
Bluereo; https://www.youtube.com/watch?v=VIPbMeMSReU&feature=youtu.be. Nov. 2, 2017, 1 page.

* cited by examiner

TOOTHBRUSH SUCTION APPARATUS AND METHOD

CROSS-REFERENCE TO RELATED APPLICATIONS

This application is a national phase entry under 35 USC 371 of International Patent Application No. PCT/US19/35997 filed on Jun. 7, 2019, which claims priority benefit of U.S. Provisional Application No. 62/682,464, filed on Jun. 18, 2018, which are both incorporated herein by reference in their entireties.

FIELD OF THE DISCLOSURE

The present disclosure generally relates to toothbrushes and, more particularly, to a suction device for a toothbrush.

BACKGROUND

Toothbrushes are an effective and common method for plaque removal. Management of fluids while brushing, however, can be a challenge for members of the young, convalescent, elderly, or disabled populations, who may have difficulty spitting and may tend to swallow or aspirate toothpaste and particulates removed from teeth during brushing. The remaining fluids after brushing contain microorganisms and bacteria that can result in dental caries, respiratory diseases, and pneumonia. While it has been well documented in the literature that powered toothbrushes offer enhanced brushing capability, the inventors are unaware of reliable, convenient mechanisms incorporated within or associated with, existing toothbrushes, whether manual or power-assisted, to collect toothpaste, saliva, water, blood, bacteria, food, plaque, or other debris from a person's mouth during brushing.

SUMMARY

In accordance with a first aspect of the present disclosure, a suction apparatus for a toothbrush is provided. The toothbrush includes a head, a neck, and a handle. The suction apparatus includes a housing configured to couple to the toothbrush, the housing including a suction head portion sized to extend around sides and a back of the toothbrush head. The housing is spaced from the toothbrush head by a gap. The suction apparatus further includes a vacuum pump, a collection reservoir, and one or more conduits that couple the vacuum pump, suction head portion, and collection reservoir to apply a suction around the toothbrush head through the gap and deposit suctioned material in the collection reservoir.

According to one form, the suction apparatus can further include a foam or other porous material disposed at least partially in the gap between the suction head portion and the toothbrush head and/or a one-way valve configured to prevent back flow of the suctioned material from the collection reservoir.

According to another form, the one or more conduits can include a vacuum tube that fluidly couples the vacuum pump to the collection reservoir and a waste tube that fluidly couples the suction head portion to the collection reservoir. In this form, the one-way valve can include at least one of the following: The waste tube extending to a position adjacent a bottom wall of the collection reservoir and the vacuum tube extending to an intermediate position within the collection reservoir; or the vacuum and waste tubes flexibly coupling the collection reservoir to the toothbrush such that the collection reservoir hangs in an upright configuration. According to a further form, the waste tube can at least partially extend co-axially within the vacuum tube. According to yet a further form, the co-axial tubing can include nested funnel portions having frusto-conical configurations.

According to another form, the housing can include a neck portion configured to snap-fit to the toothbrush neck so that the suction head portion extends around the sides and back of the toothbrush head. According to a further form, the neck portion of the housing can be configured to create an airtight coupling with the toothbrush neck, and the one or more conduits can include tubing fluidly coupled to the suction head portion of the housing.

According to another form, the suction apparatus can be provided in combination with the toothbrush, such that the housing is integral with the toothbrush. According to further forms, the combination can include one or more of the following: The toothbrush can be a powered toothbrush and a power source can provide power to both the powered toothbrush and the vacuum pump; the head and neck of the toothbrush can be removably coupled to the handle and the one or more conduits can include a separable connection allowing the housing to be decoupled from vacuum pump and collection reservoir; or the collection reservoir can be removably coupled to the toothbrush handle.

In accordance with a second aspect, a method for suctioning material from and adjacent to a head of a toothbrush is provided and includes creating suction with a vacuum pump, applying the suction to a gap between the toothbrush head and a suction head portion of a housing coupled to the toothbrush, and transferring suctioned material to a collection reservoir through one or more conduits.

According to some forms, the method can further include one or more of the following: Breaking surface tension of fluids adjacent to the suction head portion with a foam or other porous material disposed at least partially in the gap; preventing backflow of suctioned material from the collection reservoir with a one-way valve; supplying power to the vacuum pump and an electric toothbrush with a power source; removably coupling the housing to the toothbrush; or removably coupling the collection reservoir to the toothbrush.

BRIEF DESCRIPTION OF THE DRAWINGS

The above needs are at least partially met through provision of the embodiments described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE PREFERRED EMBODIMENTS

A suction assembly, toothbrush, and method are provided that advantageously suction fluids and debris resulting from brushing, including toothpaste, saliva, and other brushing by-products. The suction effectively removes liquids, foams, and other materials from the mouth of a user either during or after brushing to thereby prevent or minimize materials or liquids from being aspirated by the user to reduce the risk of infection by preventing harmful bacteria from getting into a user's lungs. The assembly and toothbrush is advantageously portable and includes a vacuum pump, collection tubes, and, optionally, a sponge for optimal suction.

The suction assembly, toothbrush, and method can help to prevent the aspiration of fluids and debris containing microorganisms by safely evacuating the fluids during brushing. As such, respiratory diseases and various comorbidities can be avoided by reducing bacterial growth from excess fluids in the oral and pulmonary cavity.

Figure 1:
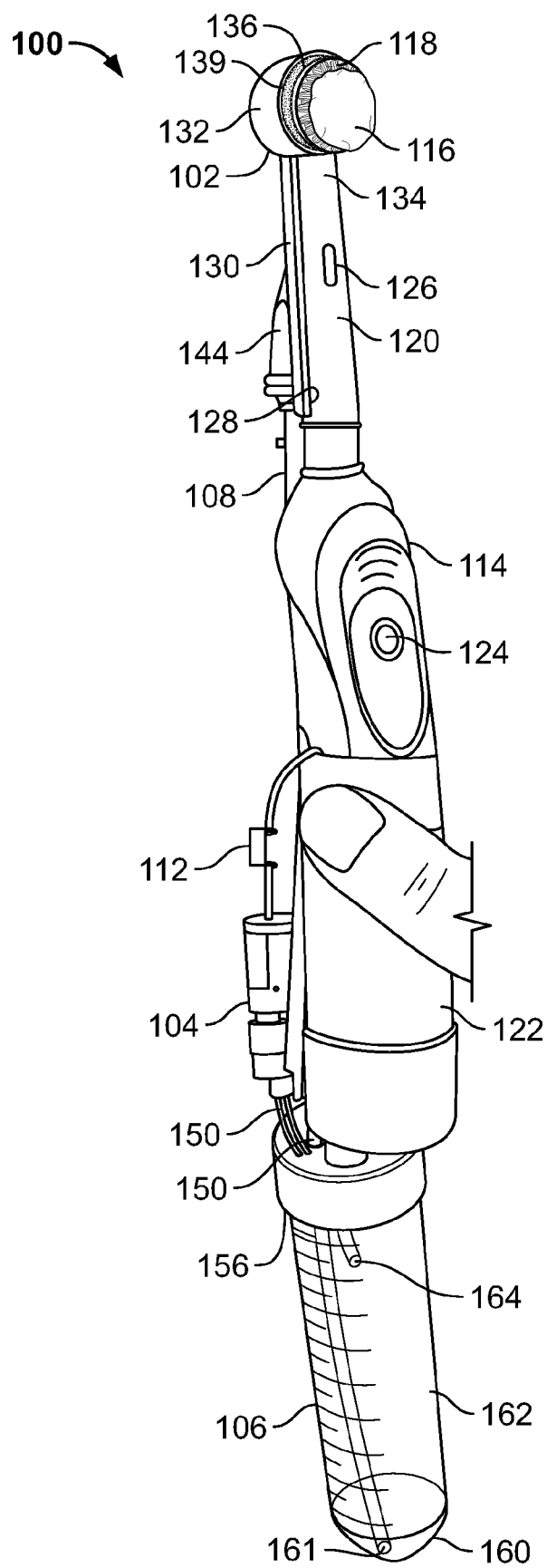
FIG. 1 is a perspective view of a toothbrush having a suction assembly coupled thereto in accordance with various embodiments of the present disclosure.
Figure 2:
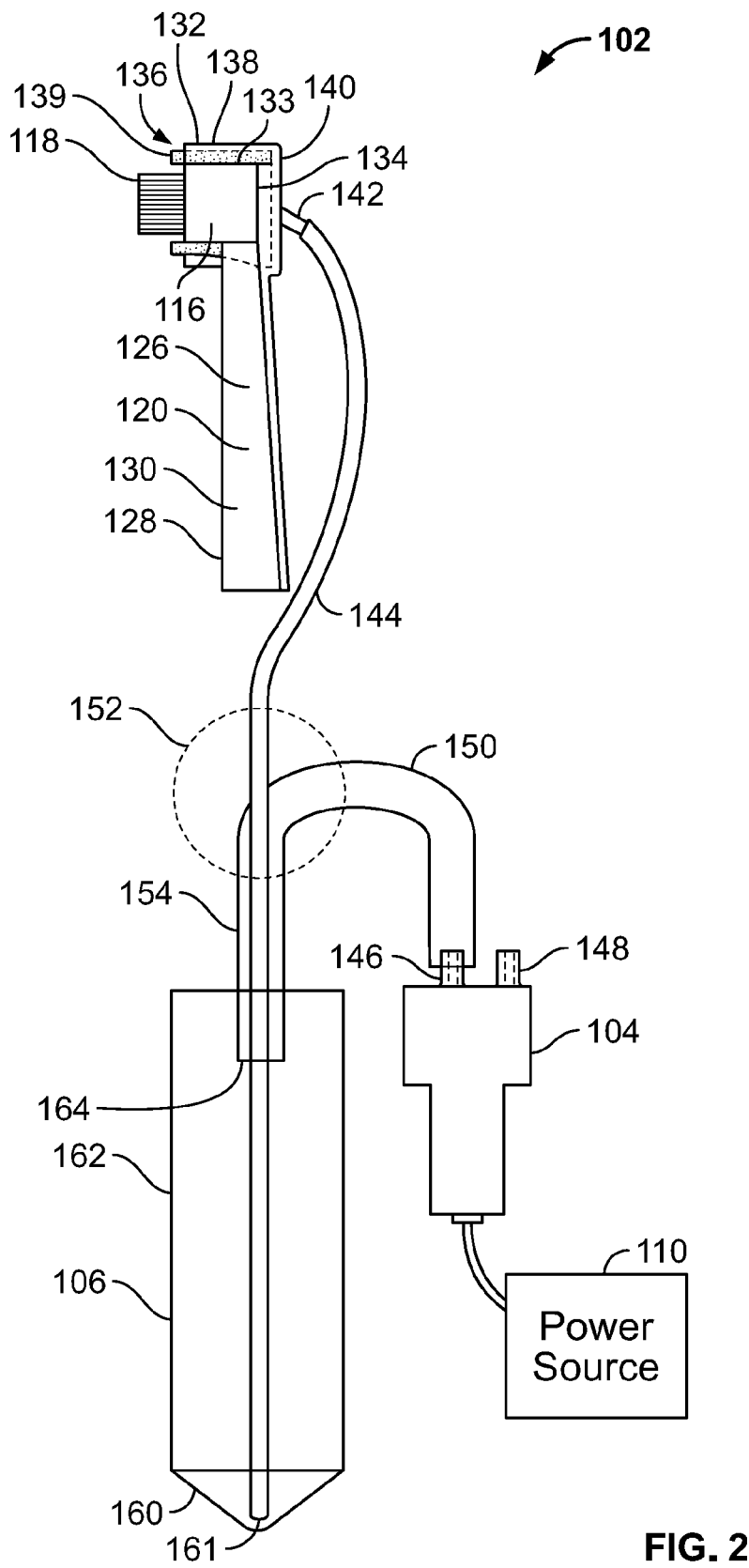
FIG. 2 is a diagrammatic view of a suction assembly for a toothbrush in accordance with various embodiments of the present disclosure.

A first embodiment of a suction assembly 100 is illustrated in FIGS. 1 and 2. The suction assembly includes a suction housing 102, a vacuum pump 104, a collection reservoir 106, and conduits 108 fluidly connecting the components. The suction assembly 100 further includes a power source 110 electrically coupled to the vacuum pump 104 and a switch device 112 to allow a user to selectively energize the vacuum pump 104. So configured, a user can actuate the switch device 112 to energize the vacuum pump 104, which creates suction in the suction housing 102 via the conduits 108 and expels any collected materials into the collection reservoir 106. With electric toothbrushes as described in more detail below, the separate switch device 112 of the suction assembly 100 allows a user to operate the assembly 100 before, during, and/or after brushing. Additionally, the power source 110 can be separate from a power source of the toothbrush or can utilize the same power source as desired. In some versions, the vacuum pump 104 is able to suction with a pressure of 20 KPa (150 mmHg). With such a configuration, the assembly 100 can provide at least an evacuation rate of about 2 to 3 mL/min and can evacuate the bolus of fluid in the mouth during normal brushing, which can include paste, debris, saliva, water, etc.

The suction assembly 100 of this form is configured to be secured to a toothbrush 114 that includes a head 116 having bristles 118, a neck portion 120 extending from the head 116, and a handle 122. In the illustrated form, the toothbrush 114 is an electric toothbrush that includes a power source 110 in the handle 122 and a switch device 124 operable to allow a user to selectively energize the toothbrush 102 as commonly understood. The electric toothbrush 114 further includes a removable tip 126 where the head and neck portion 116, 120 can be removed and replaced by a user as desired. Further, although an electric toothbrush is shown in the figures, the suction assembly 100 can be similarly secured to non-powered toothbrushes. Due to potential overheating, the vacuum pump 104 can be mounted to the toothbrush 114 in a spaced relation, such as with a hook-and-loop fastener (VELCRO™) or the like. Alternatively, the vacuum pump 104 can be disposed within a case or housing sized to provide sufficient ventilation.

The suction housing 102 has an open front 128 and includes a neck portion 130 configured to snap-fit to the neck portion 120 of the toothbrush 114 and a head portion 132. The head portion 132 has a cup-shaped or hood configuration to extend along sides 133 and a back 134 of the toothbrush head 116 and be spaced therefrom by a gap 136. The suction housing 102 is sized so that the gap 136 extends radially around the toothbrush head 116 behind or adjacent to the bristles 118. Preferably, the head portion 132 can have a sidewall 138 with a cross-sectional shape generally complementary to a shape of the toothbrush head 116 so that the gap 136 has a generally constant width. As such, although a cylindrical toothbrush head 116 having a circular cross-section is illustrated, other shapes and sizes are within the scope of the present disclosure. Further, electric toothbrushes may cause a portion of the head 116 and/or bristles 118 to move during operation, such as in an oscillating, reciprocating, pulsating, and/or rotating motion. The head portion 132 can be advantageously sized and configured so that the gap 136 has a sufficient width to accommodate any translation of the head 116 and/or bristles 118 of the toothbrush 114 resulting from this motion. The suction housing 102 can be created using any suitable process, such as injection molding or 3D printing.

To optimize the suction action through the gap 136, an open cell foam or sponge 139 can be disposed within the gap 136 to extend between the toothbrush head 116 and the sidewall 138. The foam 139 advantageously breaks the surface tension of fluids it contacts and absorbs the fluid, thereby serving as a sponge. The vacuum can then collect the fluids accumulated in the sponge and deposit the fluids in the collection reservoir 106. The foam 139 can vary in pore sizes and forms. In some embodiments, the pore sizes of the foam 139 can range from about 10 ppi (pores per inch) to about 150 ppi. For example, the foam 139 can have a reticulated form. The foam 139 can, by way of example, be polyurethane, polyethylene, polyvinyl alcohol, or a mixture of materials. In the illustrated form, the gap 136 and the foam 139 is about 1 mm and the foam 139 extends forwardly of the suction housing 102 by about 2 mm.

A back wall 140 of the head portion 132 includes a port or other connection 142 to couple to a waste tube 144 of the conduits 108. In the illustrated form, the port 142 is disposed generally centrally on the back wall 140 to align with a center of the toothbrush head 116. The waste tube 144 directs the suction generated by the vacuum pump 104 to an interior of the head portion 132 and, when the housing 102 is secured to the toothbrush 114, to the gap 136 between the head portion 132 and the toothbrush head 116. Preferably, the neck portion 130 has an air-tight engagement with the toothbrush neck 120 so that the suction generated by the vacuum pump 104 is directed entirely to the head portion 132.

A diagram of the suction assembly 100 is provided in FIG. 2 that is configured to collect fluids, debris, and particulates allowable to the pore size in the foam 139. The vacuum pump 104 has an input port 146 and an output port 148. A vacuum tube 150 is coupled to the input port 146 of the vacuum pump to drive suction within the assembly 100. As shown, the waste tube 144 and vacuum tube 150 couple to the collection reservoir 106 so that the pressure gradient present between the vacuum pump input and output ports 146, 148 applies suction around the toothbrush head 116 and water and debris are collected and deposited into the collection reservoir 106. By one optional approach, the assembly 100 can further include a small vesicle 152 and the vacuum tube 150 can include a large diameter portion 154 that extends between the small vesicle 152 and the collection reservoir 106. In this form, the waste tube 144 can extend from the port 142 of the suction housing 102, through the small vesicle 152, and through the large diameter portion 154. This concentric, co-axial configuration utilizes the large diameter portion 154 to provide a flexible support for the waste tube 144 and allows air to pass on the outside of the waste tube 144. The waste and vacuum tubes 144, 150 can have any suitable diameter, such as about 3 mm in a separate configuration. A benefit of such a configuration is that back-flow of the collected material is avoided, even when the orientation of the collection reservoir 106 is inverted.

Figure 3:
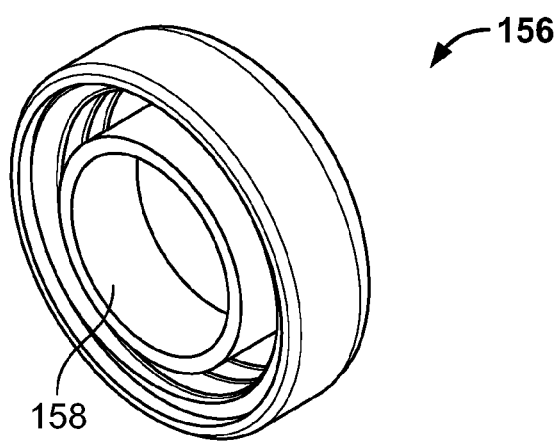
FIG. 3 is a perspective view of a cap for a collection reservoir of the suction assembly of FIG. 2 in accordance with various embodiments of the present disclosure.

Coupling the conduits 108 to the collection reservoir 106 can be achieved by any suitable form of securement. In a first approach as shown in FIG. 3, the collection reservoir 106 is provided with a cap 156 that removably secures thereto, by threading, snap-fit, friction fit, bayonet fitting, or the like. In the case of a powered toothbrush, the necessary torque and/or direction of movement to remove the cap 156 are selected relative to the collection reservoir 106 such that removal of the cap 156 does not inadvertently result in unintended disassembly of other components of the toothbrush, such as a battery housing. The cap 156 defines a central aperture 158 that is sized to receive a tube therethrough in an air-tight manner. By one approach, the aperture 158 can be sized to receive the waste tube 144 therethrough with the waste tube 144 extending to a bottom wall 160 of the collection reservoir 106 so that an opening 161 thereof is closely adjacent to the bottom wall 160. The vacuum tube 150 can be inserted into the collection reservoir 106 in any sealed configuration, such as through an opening in the cap 156 or sidewall 162.

In the co-axial approach discussed above, the cap aperture 158 can be sized to receive the large diameter portion 154 of the vacuum tube 150 therethrough, with the waste tube 144 extending co-axially therein. Regardless of the configuration, the vacuum tube 150 can have an opening 164 that is positioned at an intermediate position within the collection reservoir 106. For example, the vacuum tube 150 can extend to a position closely adjacent to the cap 156, such as spaced above a percentage of volume of the collection reservoir 106, such as 50%, 75%, 85%, and so forth. As the suctioned fluid is collected in the bottom of the reservoir 106, the vacuum tube opening 164 being spaced from the bottom wall 160 minimizes backup flow until a sufficiently large volume of collected fluid can access the tube 150 when the reservoir 106 is held at an angle. This advantageously provides a one-way valve functionality that restricts collected fluids from backing up to the vacuum inlet port 146 when the toothbrush 114 is held at an angle. Of course, a one-way valve can alternatively be positioned within the vacuum tube 150 to prevent back up.

Figure 4:
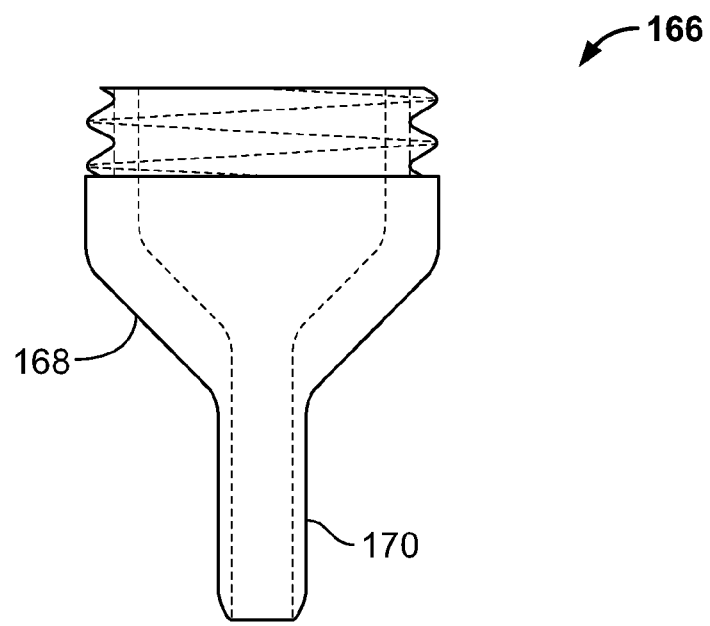
FIG. 4 is a side elevational view of a collection funnel for a suction assembly in accordance with various embodiments of the present disclosure.
Figure 5:
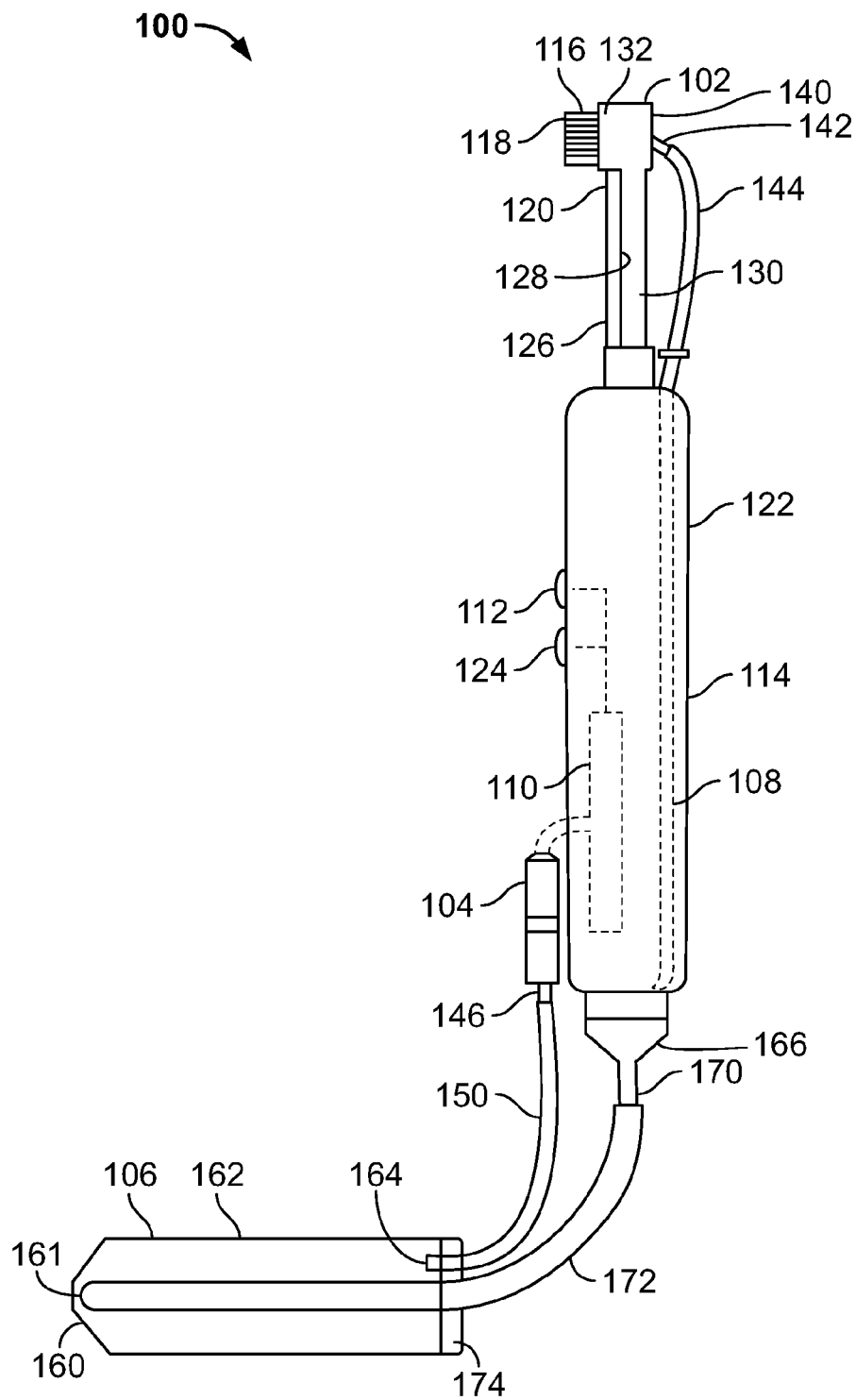
FIG. 5 is a side elevational view of a toothbrush having an alternate suction assembly coupled thereto, in accordance with various embodiments of the present disclosure.

In another approach as illustrated in FIGS. 4 and 5, the waste tube 144 includes a collection funnel 166 mounted to the toothbrush handle 122, such as with threading as shown, a snap-fit, or other suitable connection. The collection funnel 166 includes a frusto-conical portion 168 and a spout 170. The waste tube 144 extends from the port 142 of the suction housing 102 down the toothbrush 114 and empties into the collection funnel 166. The waste tube 144 of this form can include tubing that runs external to the toothbrush 114, internal to the toothbrush, and combinations thereof. The waste tube 144 of this form further includes a connection portion 172 that fluidly couples to the spout 170 of the funnel 166 and extends to the collection reservoir 106. The connection portion 172 can be integral with a cap 174 of the collection reservoir 106 or can sealingly engage the cap 174 as with the above embodiment. Further, the connection portion 172 can also extend to the bottom wall 160 of the collection reservoir 106. The vacuum tube 150 can be inserted into the collection reservoir 106 in any sealed configuration, such as through an opening in the cap 174 or the sidewall 162. By yet a further approach, the vacuum tube 150 can include a large diameter portion similar to the embodiment discussed above and the connection portion 172 of the waste tube 144 can extend within the large diameter portion in a concentric, co-axial configuration.

As illustrated in FIG. 5, the connection portion 172 can be flexible so that the collection reservoir 106 is flexibly mounted to the toothbrush 114. This configuration allows the collection reservoir 106 to flexibly hang below the toothbrush 114 and maintain an upright or generally vertical orientation during use, regardless of the angle of the toothbrush 114. This also aids in preventing backflow of non-gaseous fluid into the vacuum pump 104 when tilted. Of course, by another approach, the collection reservoir 106 can be rigidly mounted to the toothbrush 114, such as to the handle 122, and can optionally be provided as a portion thereof. For example, the collection reservoir 106 can be connected most inferiorly on the toothbrush 114 so that the reservoir 106 extends downwardly therefrom.

The waste tube 144 can be detachable from the collection reservoir 106 and other conduits 108, to permit cleaning, sterilization, and/or connection to another vacuum pump. For example, the waste tube 144 can be connected to an external vacuum pump or a central vacuum pump system, which may provide a more powerful suction.

In another approach, the components of a suction assembly 100 can be integral with the toothbrush 114. For example, rather than a snap-fit housing, the toothbrush 114 can have a similarly configured suction head portion integrally incorporated into the head 116 of the toothbrush 114. Additionally, although the vacuum pump 104, conduits 108, switch device 112, and wires connecting the components are shown mounted to an exterior of the toothbrush 114 in FIG. 1, it will be understood that some or all of the components can be disposed within a housing mounted to the toothbrush 114 by any suitable method and/or can be disposed within the toothbrush 114. Further, it will be understood that any of the embodiments described herein can include gaskets, seals, o-rings, and so forth to maintain desired suction throughout the assembly 100.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A suction apparatus for a toothbrush having a body including a head, a neck, and a handle, the suction apparatus comprising:
   a housing configured to couple to the toothbrush, the housing including a suction head portion sized to extend around sides and a back of the toothbrush head and be spaced from the toothbrush head by a gap;
   a vacuum pump;
   a collection reservoir;
   one or more conduits coupling the vacuum pump, suction head portion, and collection reservoir to apply a suction around the toothbrush head through the gap and deposit suctioned material in the collection reservoir; and
   a one-way valve configured to prevent back flow of the suctioned material from the collection reservoir;
   wherein the one or more conduits include a vacuum tube fluidly coupling the vacuum pump to the collection reservoir and a waste tube fluidly coupling the suction head portion to the collection reservoir; and
   wherein the one-way valve comprises at least one of: the waste tube extending to a position adjacent a bottom wall of the collection reservoir and the vacuum tube extending to an intermediate position within the collection reservoir; or the vacuum and waste tubes flexibly coupling the collection reservoir to the toothbrush such that the collection reservoir hangs in an upright configuration.

2. The suction apparatus of claim 1, further comprising foam or other porous material disposed at least partially in the gap between the suction head portion and the toothbrush head.

3. The suction apparatus of claim 1, wherein the waste tube at least partially extends co-axially with the vacuum tube.

4. The suction apparatus of claim 3, wherein the co-axial tubing comprises nested funnel portions having frusto-conical configurations.

5. The suction apparatus of claim 1, wherein the housing further includes a neck portion configured to snap-fit to the toothbrush neck so that the suction head portion extends around the sides and back of the toothbrush head.

6. The suction apparatus of claim 5, wherein the neck portion of the housing is configured to create an airtight coupling with the toothbrush neck, and the conduits include tubing fluidly coupled to the suction head portion of the housing.

7. The suction apparatus of claim 1 in combination with the toothbrush; and wherein the housing is integral with the toothbrush.

8. The combination of claim 7, wherein the toothbrush comprises a powered toothbrush, a power source providing power to the powered toothbrush and the vacuum pump.

9. The combination of claim 8, wherein the head and neck of the toothbrush are removably coupled to the handle, and the one or more conduits include a separable connection allowing the housing to be decoupled from vacuum pump and collection reservoir.

10. The combination of claim 7, where the collection reservoir is removably coupled to the toothbrush handle.

11. A method for suctioning material from and adjacent to a head of a toothbrush, the method comprising:
    creating suction with a vacuum pump;
    applying the suction via one or more conduits to a gap between the toothbrush head and a suction head portion of a housing coupled to the toothbrush, the suction head portion of the housing extending around sides and a back of the toothbrush head and spaced from the toothbrush head by the gap; and
    transferring suctioned material to deposit the suctioned material in a collection reservoir through the one or more conduits, the one or more conduits including a vacuum tube fluidly coupling the vacuum pump to the collection reservoir and a waste tube fluidly coupling the suction head portion to the collection reservoir; and
    preventing back flow of the suctioned material from the collection reservoir with a one-way valve by:
        extending the waste tube to a position adjacent a bottom wall of the collection reservoir and extending the vacuum tube to an intermediate position within the collection reservoir; or
        flexibly coupling the collection reservoir to the toothbrush with the vacuum and waste tubes such that the collection reservoir hangs in an upright configuration.

12. The method of claim 11, further comprising breaking surface tension of fluids adjacent to the suction head portion with a foam or other porous material disposed at least partially in the gap.

13. The method of claim 11, wherein the toothbrush comprises a powered toothbrush, and further comprising supplying power to the vacuum pump and the toothbrush with a power source.

14. The method of claim 11, further comprising removably coupling the housing to the toothbrush.

15. The method of claim 11, further comprising removably coupling the collection reservoir to the toothbrush.

* * * * *